A. N. OZIAS, DEC'D.
R. V. L. HAXBY & D. L. FAIRCHILD, ADMINISTRATORS.
TEMPERATURE INDICATING INSTRUMENT.
APPLICATION FILED OCT. 27, 1911.

1,038,426.

Patented Sept. 10, 1912.

Witnesses
Elizabeth Griffeth
Walter P. Brown

Inventor
Albert N. Ozias
By Church & Church
his Attorneys

UNITED STATES PATENT OFFICE.

ALBERT N. OZIAS, OF MINNEAPOLIS, MINNESOTA; R. V. L. HAXBY AND D. L. FAIRCHILD, BOTH OF HENNEPIN COUNTY, MINNESOTA, ADMINISTRATORS OF SAID OZIAS, DECEASED.

TEMPERATURE-INDICATING INSTRUMENT.

1,038,426.        Specification of Letters Patent.      Patented Sept. 10, 1912.

Application filed October 27, 1911. Serial No. 657,069.

*To all whom it may concern:*

Be it known that I, ALBERT N. OZIAS, a citizen of the United States, residing at Minneapolis, in the county of Hennepin and State of Minnesota, have invented certain new and useful Improvements in Temperature-Indicating Instruments; and I do hereby declare the following to be a full, clear, and exact description of the same, reference being had to the accompanying drawing, forming part of this specification, and to the figures and letters of reference marked thereon.

This invention relates to instruments in which variations in temperature will cause an indication or perform mechanical functions for the purpose of indicating or controlling temperature conditions or for compensating for variations in condition produced by changes in temperature.

The invention depends for its operation upon the differential expansion of metallic elements, one of the objects being to provide a construction and arrangement of the parts whereby an increased movement of the indicating or controlling devices may be produced by a given change in temperature without increasing the length of the members having different coefficients of expansion.

Another object of the invention is to provide a device of exceedingly simple construction which may be housed in a casing of small compass and preferably of circular contour and which will embody in its construction a minimum number of independent elements.

The invention primarily consists in an instrument which is actuated by the differential expansion of metallic elements under the influence of changes in temperature and wherein the movement caused by the differential expansion of the metallic elements is augmented by a relative transverse displacement of the intermediate portions of arc members, one or both of which are changed in curvature by variations in temperature.

The invention further consists in certain novel details of construction and combinations and arrangements of parts all as will be hereinafter described and pointed out particularly in the appended claims.

Figure 1:
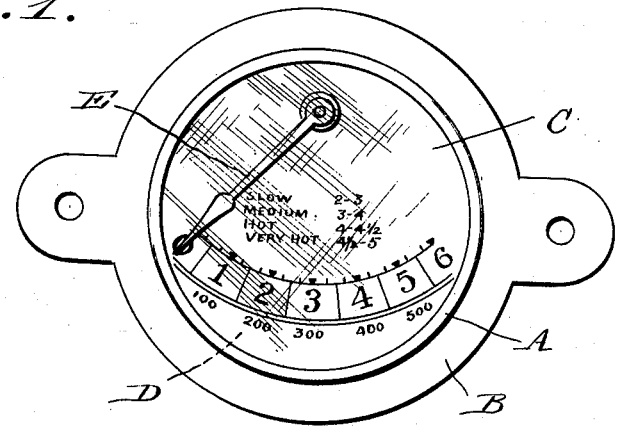
Figure 2:
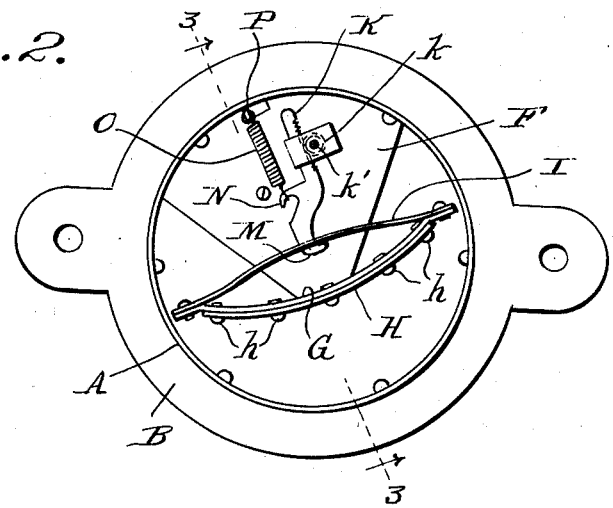
Figure 3:
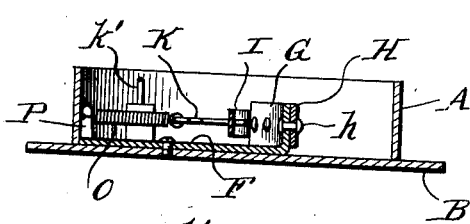
Figure 4:
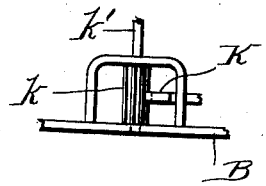

Referring to the accompanying drawings,—Figure 1 is a front elevation of a thermometer embodying the present improvements; Fig. 2 is a view of the same instrument with the dial removed; Fig. 3 is a section on the line 3—3 of Fig. 2; Fig. 4 is an edge elevation showing the rack bar and pinion for translating the movement of the arc members into an angular movement of the indicating hand.

Like letters of reference in the several figures indicate the same parts.

In the embodiment of the invention illustrated in the accompanying drawings, (which it will be understood is simply typical, inasmuch as the invention may be used in any form of controlling instrument or apparatus wherein movement must be effected by changes in temperature or the effect of changes in temperature upon movable parts neutralized) the working parts are mounted in a casing which conveniently consists of a cup member A secured upon a base plate B and having a transparent or glazed cover C. Within the casing there is a dial or face plate D having graduations or indications thereon with which a pointer E is adapted to register. The casing is conveniently made circular in form whereby it may be readily placed in position in or on an oven door, for instance, with a minimum of trouble and expense.

Within the casing there is fastened by a suitable screw or otherwise a plate F conveniently of segmental shape, or with two of its edges converging to a point where they meet a transversely extending arc-shaped member G. The plate F and the arc-shaped member G are conveniently stamped up from sheet metal and preferably of metal having a high co-efficient of expansion, such, for instance, as brass. The arc-shaped member G has rigidly attached to one of its faces, preferably the convex face, a strip of metal H having a low co-efficient of expansion, such, for instance, as steel, or it might be of invar. The connection between the two metals is usually formed by a series of rivets $h, h$, thus forming a bi-metallic thermostatic bar which is curved from end to end and the curvature of which will vary in accordance with changes of temperature, a higher temperature causing the curvature of the arc-shaped thermostat to lessen, while the lower temperature increases the curvature in the well understood manner. To each end of the bi-metallic arc-shaped members there is attached rigidly the ends of a member I, said member I, however, being flexible and having a low co-efficient of expansion, whereby any changes in the curvature of the bi-metallic member will vary the distance between the two arc members at the center line, the relative movement at this point being much greater than the actual movement of the ends of the arc members, as will be readily understood. Centrally of the arc member I there is attached a rack bar K with which a pinion $k$ on an arbor $k'$ is adapted to mesh. Said arbor projects through the face plate of the instrument and is adapted for the reception of the indicator or pointer E. The rack K is preferably of the conformation illustrated in Fig. 2, that is to say, it is provided with a hook-shaped head or end M adapted to pass through an aperture in the arc member I whereby it will be held in engagement therewith, and with a finger or tooth N for the reception of one end of a light coil spring O, the opposite end of which spring is secured to an upturned finger or bracket P on the plate F. The projection of the rack bar carrying the teeth for engagement with the pinion, extends in a direction substantially parallel with the spring and the arrangement is such that the spring normally tends to hold the teeth of the rack bar in engagement with the teeth of the pinion with a light pressure sufficient to maintain the operative engagement without lost motion between the parts, but without creating sufficient pressure to interfere with the effective operation of the device.

The action of the bi-metallic member on the flexible member is to change the stress in the same and while the spring O may serve as a means for deflecting the flexible member, it is not essential as the stress (tension or compression) of the flexible member will be increased or decreased by the bi-metallic member, regardless of the employment of the spring, and said flexible member will be deflected or resist deflection more or less, as the case may be.

With an instrument as thus constructed it will be noted that the available movement caused by a change in temperature is many times greater than the movement of the ends of the arc members, due to the fact that the transverse movement caused by the straightening out or the decrease in the curvature of both of the arc members is utilized. The range of movement thus secured, it is believed, has never before been equaled without the employment of chord members, nor with the use of arc members the curvature of which is reduced or lessened by an increase or rise in temperature.

The construction lends itself very favorably to an exceedingly compact arrangement of the mechanism as all of the operating parts may, as illustrated in the drawing, be mounted in a small circular casing, and at the same time the construction and arrangement is such that the parts may be made in quantities at small expense and when assembled will require comparatively little separate adjustment in order to operate with accuracy. Furthermore the structure lends itself very favorably to the construction of thermometers adapted to indicate high temperatures, oven thermometers, for instance, although its usefulness is by no means limited to this particular field, as the essential elements, to wit: the bi-metallic arc member, the curvature of which is changed by variations in temperature, and the deflectable member rigidly attached at its opposite ends to the opposite ends of the arc member, may be utilized in an infinite variety of instruments and mechanisms designed to indicate or control temperature conditions or to neutralize the effect of variations in temperature.

Having thus described my invention, what I claim as new and desire to secure by Letters Patent of the United States, is:—

1. In a device of the character set forth, the combination with a curved bi-metallic arc member, the curvature of which is changed by variations in temperature, of a deflectable member attached rigidly at its opposite ends to the opposite ends of the bi-metallic member, and mechanism to be controlled by the changes in curvature of the bi-metallic member connected with the deflectable member at a point intermediate the ends of the latter.

2. In a device of the character set forth, the combination with a curved bi-metallic arc member, the curvature of which is changed by variations in temperature, of a deflectable arc member attached rigidly at its opposite ends to the opposite ends of the bi-metallic arc member, and yielding means for utilizing the variations in such deflection effected by the change in curvature of the bi-metallic member.

3. In a device of the character set forth, the combination with a curved bi-metallic arc member, the curvature of which is changed by variations in temperature, of a flexible member attached rigidly at its opposite ends to the opposite ends of the bi-metallic member, and mechanism including a spring connected with the flexible member intermediate the ends of the latter and controlled by the changes in curvature of the two members due to variations in temperature.

4. In a device of the character set forth, the combination with a curved bi-metallic arc member, the curvature of which is changed by variations in temperature, and a support connected therewith, of a flexible member attached rigidly at its opposite ends to the opposite ends of the bi-metallic member, actuated mechanism mounted on the said support and connected with the flexible member at a point intermediate the ends of the latter.

5. In a device of the character set forth, the combination with a curved bi-metallic arc member, the curvature of which is changed by variations in temperature, of a flexible member attached rigidly at its opposite ends to the opposite ends of the bi-metallic member, and deflected centrally away from the bi-metallic member, and mechanism actuated by the changes in curvature of the bi-metallic and flexible members under the influence of variations in temperature.

6. In a device of the character set forth, the combination with a curved bi-metallic arc member, the curvature of which is changed by variations in temperature, an oppositely curved arc member attached rigidly at its opposite ends to opposite ends of the bi-metallic member, and mechanism actuated by the changes in curvature of the two arc members due to variations in temperature.

7. In a metallic thermometer, the combination with a base plate, an indicator journaled on said base plate and a bi-metallic arc member connected with the base plate at one side of the indicator, of a flexible arc member rigidly attached at its opposite ends to opposite ends of the bi-metallic member, a rack bar connected with the intermediate portion of the flexible arc member for operating the indicator, and a spring for maintaining the parts under tension in one direction, substantially as described.

8. In a metallic thermometer, the combination with a base plate formed of metal having a high co-efficient of expansion and provided at one end with a curved arc member, a plate of metal having a low co-efficient of expansion rigidly attached to the convex face of said curved arc member, and an indicator journaled on the plate, of a flexible arc member having its opposite ends rigidly attached to the opposite ends of the first mentioned arc member, a rack bar connected with the intermediate portion of the flexible member, and a tension spring connected at one end with a rack bar and at its opposite end with the base plate.

9. The combination with a curved bi-metallic member, of a flexible member attached at its opposite ends to the opposite ends of the curved bi-metallic member, whereby the stress in the flexible member is changed by the action of the bi-metallic member under the influence of variations in temperature and mechanism to be controlled connected with the flexible member intermediate its ends.

10. The combination with a curved bi-metallic arc member, the curvature of which is changed by variations in temperature, of a flexible normally deflected arc member attached at its opposite ends to opposite ends of the bi-metallic arc member, whereby stress in the flexible member, together with the extent of its deflection is changed by the action of the bi-metallic member under the influence of variations in temperature and mechanism to be controlled connected with the flexible member intermediate its ends.

ALBERT N. OZIAS.

Witnesses:
ELLEN LARSON,
L. A. HULACLUK.